United States Patent
Hisada

(10) Patent No.: US 9,537,361 B2
(45) Date of Patent: Jan. 3, 2017

(54) ROTOR AND ELECTRIC ROTATING MACHINE

(71) Applicant: DENSO CORPORATION, Kariya, Aichi-pref. (JP)

(72) Inventor: Tomokazu Hisada, Anjo (JP)

(73) Assignee: DENSO CORPORATION, Kariya (JP)

(*) Notice: Subject to any disclaimer, the term of this patent is extended or adjusted under 35 U.S.C. 154(b) by 495 days.

(21) Appl. No.: 14/032,503

(22) Filed: Sep. 20, 2013

(65) Prior Publication Data
US 2014/0084732 A1   Mar. 27, 2014

(30) Foreign Application Priority Data
Sep. 21, 2012  (JP) .................................. 2012-208704

(51) Int. Cl.
H02K 21/12   (2006.01)
H02K 1/27    (2006.01)
H02K 29/03   (2006.01)

(52) U.S. Cl.
CPC ............... *H02K 1/27* (2013.01); *H02K 1/276* (2013.01); *H02K 29/03* (2013.01); *H02K 2201/06* (2013.01); *H02K 2213/03* (2013.01)

(58) Field of Classification Search
CPC ...... H02K 1/27; H02K 1/276; H02K 2213/03; H02K 29/03; H02K 2201/06
USPC .......................... 310/156.36, 156.43, 156.47, 156.53,310/156.56, 156.01–156.84
See application file for complete search history.

(56) References Cited

U.S. PATENT DOCUMENTS

| | | | | |
|---|---|---|---|---|
| 5,986,374 A * | 11/1999 | Kawakami | ............. | H02K 1/278 310/156.13 |
| 7,067,948 B2 * | 6/2006 | Yamaguchi | ............ | H02K 1/278 310/156.47 |
| 7,397,159 B2 * | 7/2008 | Yoshinaga | ............. | H02K 21/14 310/112 |
| 7,518,277 B2 * | 4/2009 | Nemoto | ................. | H02K 29/03 310/156.45 |
| 7,906,880 B2 * | 3/2011 | Okubo | .................... | H02K 1/278 310/156.25 |
| 2005/0179334 A1 | 8/2005 | Yoshinaga | | |

(Continued)

FOREIGN PATENT DOCUMENTS

| | | |
|---|---|---|
| JP | 2000-175389 | 6/2000 |
| JP | 4269953 | 3/2009 |
| JP | 2010-183778 | 8/2010 |

OTHER PUBLICATIONS

Machine translation for JP 2000-175389 Aug. 30, 2016.*

(Continued)

*Primary Examiner* — Hanh Nguyen
(74) *Attorney, Agent, or Firm* — Nixon & Vanderhye PC

(57) ABSTRACT

A rotor is provided which includes a first rotor portion, a second rotor portion which is arranged at a position deviated from the first rotor portion by a predetermined skew angle so as to contact the first rotor portion, first magnets each of which is provided in a magnetic pole of the first rotor portion, and second magnets each of which is provided in a magnetic pole of the second rotor portion and is arranged at a position deviated from the first magnet of the first rotor portion by the predetermined skew angle. Coercive field strengths of the first magnets and coercive field strengths of the second magnets are different from each other.

6 Claims, 3 Drawing Sheets

(56) References Cited

U.S. PATENT DOCUMENTS

2009/0236923 A1\* 9/2009 Sakai .................. H02K 1/2766
310/156.43

OTHER PUBLICATIONS

Office Action (2 pages) dated Aug. 19, 2014, issued in corresponding Japanese Application No. 2012-208704 and English translation (2 pages).

\* cited by examiner

ROTOR AND ELECTRIC ROTATING MACHINE

CROSS-REFERENCE TO RELATED APPLICATION

This application is based on and claims the benefit of priority from earlier Japanese Patent Application No. 2012-208704 filed Sep. 21, 2012, the description of which is incorporated herein by reference.

BACKGROUND OF THE INVENTION

Technical Field

The present invention relates to a rotor having a first rotor portion and a second rotor portion, and to an electric rotating machine having the rotor.

Related Art

In order to reduce magnetic sound, the rotor of an IPM (Interior Permanent Magnet Motor) is divided into two stages in the axial direction, and the divided two stages are arranged being relatively deviated by ½ slot pitch angle. According to this configuration, pulsating components are offset in the torque waveforms generated in the first rotor portion and the second rotor portion.

In this regard, a patent document JP-B-4269953, for example, discloses an example of a technique related to an electric rotating machine which aims to more smoothly offset the pulsating components in the torque waveforms. In this electric rotating machine, the rotor is divided into three stages in the axial direction. Of the three stages (three rotor portions), a first rotor portion whose stack thickness is half of that of a second rotor portion is arranged at both ends, and the second rotor portion is arranged in between the first rotor portions, with the second rotor portion being deviated from the first rotor portions by ½ slot pitch angle.

However, application of the stage skew described in the patent document JP-B-4269953 raises the following problem. Specifically, when a magnetic field based on a predetermined current is applied to the rotor from the stator to generate torque, a magnetic field vector from the stator is generated at a position deviated from an optimum control lead angle by ½ slot pitch angle. In this case, the rotor arranged rearward with respect to the rotation direction is controlled on the basis of a lead angle advanced by ½ slot pitch. In a rotor having magnets and used for an IPM or an SPM (Surface Permanent Magnet Motor), the amount of demagnetizing field acting on the magnets is increased when the lead angle is advanced. As a result, the magnets are demagnetized, disabling generation of predetermined torque.

SUMMARY OF THE INVENTION

An embodiment provides a rotor which can enhance anti-demagnetization properties by arranging magnets that have optimum coercive field strength, in each portion of a stage-skewed rotor.

As an aspect of the embodiment, a rotor is provided which includes: a first rotor portion; a second rotor portion which is arranged at a position deviated from the first rotor portion by a predetermined skew angle so as to contact the first rotor portion; first magnets each of which is provided in a magnetic pole of the first rotor portion; and second magnets each of which is provided in a magnetic pole of the second rotor portion and is arranged at a position deviated from the first magnet of the first rotor portion by the predetermined skew angle. Coercive field strengths of the first magnets and coercive field strengths of the second magnets are different from each other.

DETAILED DESCRIPTION OF THE PREFERRED EMBODIMENTS

Figure 1:
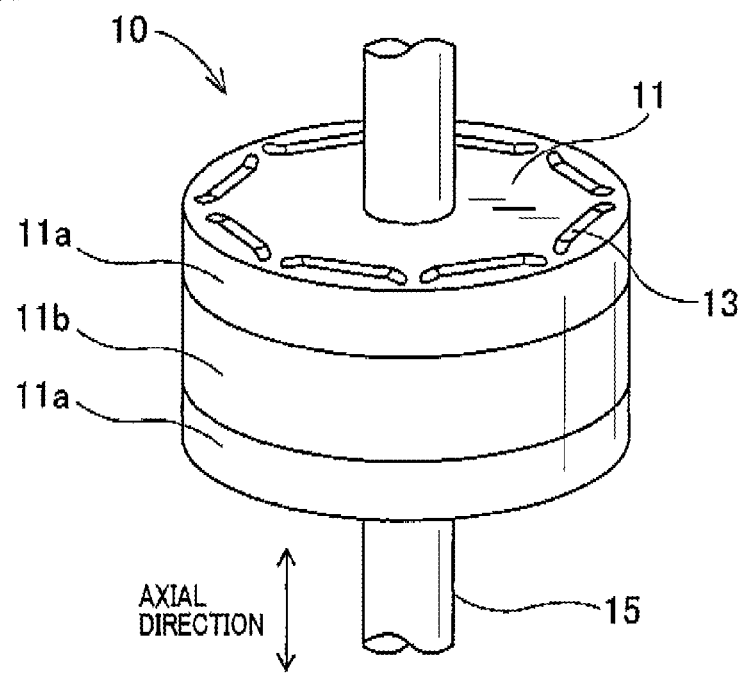
FIG. 1 is a schematic perspective view illustrating an example of a configuration of a rotor.

With reference to the accompanying drawings, hereinafter is described an embodiment to which the present invention is applied. Throughout the drawings attached to the present specification, the components identical with or similar to each other are given the same reference numerals for the sake of omitting unnecessary explanation.

FIG. 1 is a schematic perspective view illustrating an example of a configuration of a rotor 10. The rotor 10 shown in FIG. 1 includes a rotor core 11 and a rotating shaft 15 (main shaft). The rotor core 11 and the rotating shaft 15 are fixed to each other (including detachable fixation) or integrally formed so as to cooperatively rotate. The rotor core 11, which is formed by stacking electromagnetic steel sheets, includes a plurality of magnet portions 13 in each of the magnetic poles that are provided by equally dividing the outer periphery of the rotor core 11. The rotor core 11 is divided into first rotor portions 11a and a second rotor portion 11b. An example of a configuration of the first and second rotor portions 11a and 11b will be described later.

Figure 2:
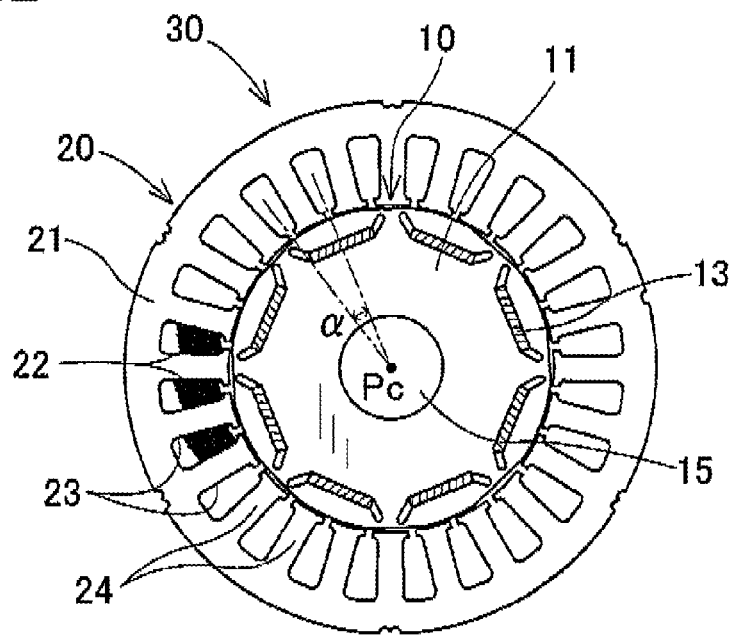
FIG. 2 is a schematic plan view illustrating an example of a configuration of an electric rotating machine.

FIG. 2 is a schematic plan view illustrating an example of a configuration of an electric rotating machine 30. The electric rotating machine 30 shown in FIG. 2 is an inner-rotor IPM. The electric rotating machine 30 includes the rotor 10 and a stator 20. The outer so peripheral surface of the rotor 10 and the inner peripheral surface of the stator 20 are opposed to each other via a magnetic gap (very small gap) through which magnetic flux flows. The stator 20 includes a stator core 21 and a winding 22 (stator coil). The stator core 21 is provided with teeth 24 to form a plurality of slots 23. The stator core 21 includes first stator portions 21a and a second stator portion 21b. An example of a configuration of the first and second stator portions 21a and 21b will be described later (refer to FIG. 3). The winding 22 (coil) wound about the stator core 21 may be a single electric wire (including a conductive wire, a copper wire, or the like) or may be a plurality of electric wires which are connected to each other at portions other than accommodating portions of the slots 23 (e.g., at coil ends) for the formation of a single wire.

Here, the number of slots that is the number of slots 23 is Sn, a slot factor that is the rate of slots 23 per phase with respect to magnetic poles (magnets) is S, the number of magnetic poles is Mn, and the number of phases is Ph. Based on this, a formula "Sn=S×Mn×Ph" is established. In the example of the present embodiment, S=1, Mn=8 and Ph=3. Accordingly, the slot number Sn=24. Since the slot factor S=1, a slot pitch angle α equals to a relative angle between adjacent slots 23 (centering on a shaft axis Pc). Although not shown, when "slot factor≥2" is established, the slots 23 of (S−1) are interposed between the slots 23 that form the slot pitch angle α.

Figure 3:
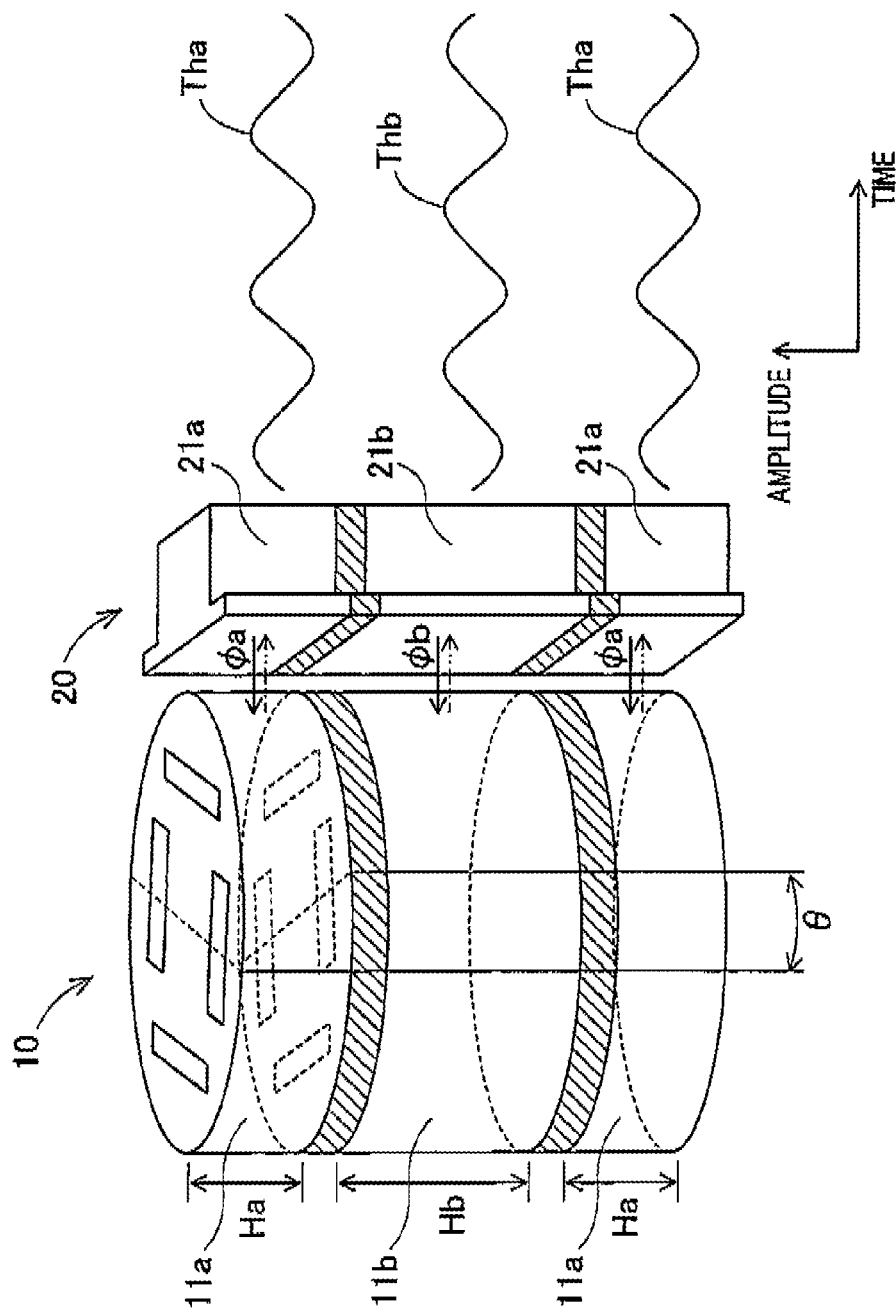
FIG. 3 is a schematic diagram illustrating an example of a configuration of a rotor and an example of output waveforms.

FIG. 3 shows an arrangement relationship of the rotor portions to the stator portions, and torque waveforms generated based on the arrangement relationship. However, FIG. 3 omits the winding 22. The rotor core 11 has two first rotor portions 11a and one second rotor portion 11b. The second rotor portion 11b is axially sandwiched between the first rotor portions 11a.

The first rotor portions 11a are opposed to the respective first stator portions 21a via the magnetic gap. The second rotor portion 11b is opposed to the second stator portion 21b via the magnetic gap. The first stator portions 21a and the second stator portion 21b are virtually provided in order to explain the torque waves. In fact, the stator 20 is monolithically formed with no skew.

When current passes through the winding 22 to generate magnetic fluxes φa and φb in the stator 20, the rotor 10 is rotated according to Fleming's rule. The magnetic flux φa flows from the first stator portions 21a to the first rotor portions 11a via the magnetic gap. Thus, the rotating torque indicated by a torque waveform Tha is generated in each first rotor portion 11a. The magnetic flux φb flows from the second stator portion 21b to the second rotor portion 11b via the magnetic gap. Thus, the rotating torque indicated by a torque waveform Thb is generated in the second rotor portion 11b.

The torque waveforms Tha and Thb each include a harmonic component of a predetermined order (e.g., $6^{th}$ harmonic component). However, as shown in FIG. 3, a skew angle θ is set so that the torque waveforms will have an opposite phase to offset the harmonic component. The amplitude of the torque waveform Tha is substantially proportionate to an axis length Ha of each first rotor portion 11a. The amplitude of the torque waveform Thb is substantially proportionate to an axis length Hb of the second rotor portion 11b. In matching the maximum amplitude values of the torque waveforms Tha and Thb, it is necessary to consider that there are two first rotor portions 11a. Thus, for matching the maximum amplitudes of the both, the axis lengths of the rotor portions are set so that 2 Ha=Hb is satisfied. In other words, the axis lengths are set so that the entire axis length (2 Ha) of the first rotor portions 11a equals to the entire axis length (Hb) of the second rotor portion 11b.

The description set forth above concerns with an example of allowing the electric rotating machine 30 to function as an electric motor. However, the electric rotating machine 30 may be allowed to function as an electric generator or as a motor generator. When the rotor 10 is rotated with no current being passed through the winding 22, the magnetic fluxes φa and φb indicated by chain double-dashed lines in FIG. 3 flaw from magnets (magnets Ma and Mb described later) arranged inside or on the surface of the rotor core 11 (the first so and second rotor portions 11a and 11b), toward the stator 20. As a result, counter electromotive force is generated in the winding 22 according to Fleming's rules.

The hatched portions in FIG. 3 indicate plate-like non-magnetic members interposed as necessary. Each non-magnetic member may be formed into the same shape as that of the adjacent electromagnetic steel sheets, or may be formed into a different shape. Simple gaps can replace the non-magnetic members. Magnetic separation regions provided in between the first rotor portions 11a and the second rotor portion 11b can drastically reduce magnetic leakage, thereby suppressing generation of unnecessary harmonic components of torque.

Figure 4:
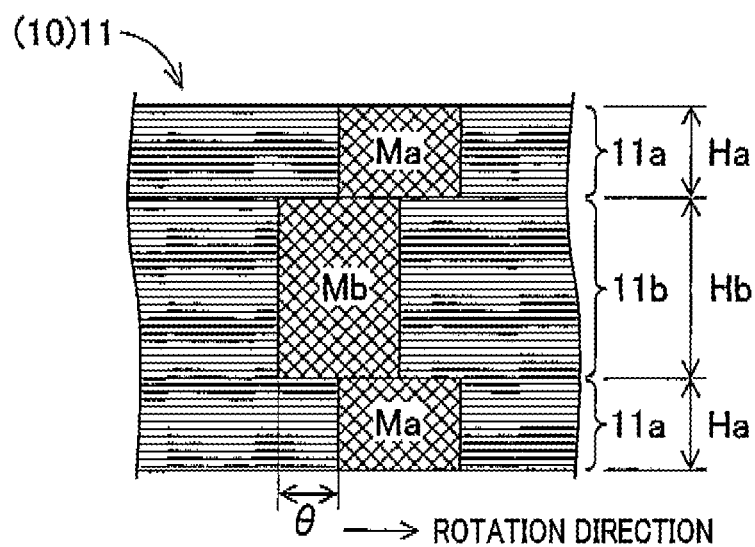
FIG. 4 is a partial cross-sectional view illustrating a configuration of a first rotor portion and a second rotor portion.

Referring now to FIG. 4, hereinafter is described the configuration of the first rotor portions 11a and the second rotor portion 11b. FIG. 4 is a partial cross-sectional view illustrating a configuration of the first rotor portions 11a and the second rotor portion 11b.

In FIG. 4, the upper-and-lower direction in the drawing sheet corresponds to the axial direction and the left-to-right direction in the drawing sheet corresponds to the rotation direction. Magnets Ma and Mb, which correspond to the magnet portions 13, are arranged inside (in the case of an IPM) or on the surface (in the case of an SPM) of the corresponding divided rotor portions. In FIG. 4, the magnets Ma and Mb of only one magnetic pole are shown for the sake of convenience. The magnets Ma and Mb of every magnetic pole have an identical cross-sectional dimension and an identical cross-sectional shape. The first rotor portion 11a and the second rotor portion 11b may be formed by axially dividing the rotor core 11 into any number of divisions. According to the number of divisions, the magnets Ma and Mb may be appropriately divided and arranged. However, when both or either of the first and second rotor portions 11a and 11b are divided into divisions, the total axis length Hb of the second rotor portions 11b may desirably be larger than the total axis length Ha of the first rotor portions 11a by a factor of two, similar to the case where the first and second rotor portions 11a and 11b are not divided. The magnet Mb of the second rotor portion 11b is arranged at a position which is deviated rearward with respect to the rotation direction from the magnet Ma of the first rotor portion 11a by the skew angle θ, so that the magnet Mb contacts the magnet Ma.

In the rotor 10 configured as described above, the relationship of a coercive field strength Cfa of the magnet Ma provided in the first rotor portion 11a to a coercive field strength Cfb of the magnet Mb provided in the second rotor portion 11b may preferably be Cfa<Cfb. This is because, the rotor portion located rearward with respect to the rotation direction is required to have a magnet having high coercive field strength and that the rotor portion located forward with respect to the rotation direction is not required to have increased coercive field strength.

Figure 5:
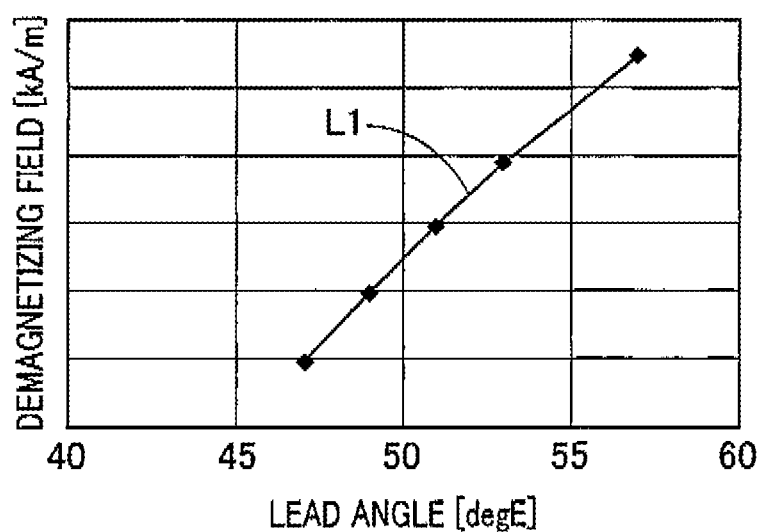
FIG. 5 is a graph showing an example of a relationship between demagnetizing field and lead angle.

This will be more specifically described referring to FIG. 5. FIG. 5 is a graph showing an example of a relationship between demagnetizing field and lead angle. FIG. 5 shows a change, with the vertical axis indicating demagnetizing field and the horizontal axis indicating lead angle. In the current that passes through the winding 22 with the application of a voltage, current phase is delayed by the inductance components of the winding 22. In order to efficiently rotate the rotor 10, the lead angle thereof is set to a value that advances the phase of the applied voltage. The lead angle may be controlled depending on conditions. However, as indicated by the characteristic line L1 in FIG. 5, as the lead angle increases, the amount of demagnetizing field increases. Since demagnetizing field extends in the direction opposite to the direction of the field of the magnets in a magnetic pole, the field of the magnetic pole is resultantly demagnetized.

As an embodiment, when the skew angle θ is set to half of the slot pitch angle α, a lead angle is derived from the number of slots, the number of magnetic poles and the number of phases in the configuration of the rotor 10 and the stator 20 shown in FIG. 2. Then, the amount of demagnetizing field of the derived lead angle can be obtained from FIG. 5. Under the control based on the derived lead angle, the magnet Mb of the second rotor portion 11b, which is located rearward with respect to the rotation direction, is demagnetized to an extent corresponding to the obtained amount of demagnetizing field. Accordingly, in order to generate predetermined torque, the coercive field strength Cfb of the magnet Mb provided in the second rotor portion 11b is required to be higher than the coercive field strength Cfa of the magnet Ma provided in the first rotor portion 11a, by an extent corresponding to the amount of demagnetizing field.

On the other hand, the magnet Ma of the first rotor portion 11a, which is arranged forward with respect to the rotation direction and is controlled with an optimum control lead angle, has an extremely small amount of demagnetizing field with respect to the lead angle and thus will not be demagnetized. Accordingly, the coercive field strength Cfa of the magnet Ma provided in the first rotor portion 11a may be lower than the coercive field strength Cfb of the magnet Mb provided in the second rotor portion 11b.

For this reason, the magnet Ma provided in the first rotor portion 11a is permitted to have a coercive field strength which is lower than that of the magnet Mb provided in the second rotor portion 11b, by an amount corresponding to the amount of demagnetizing field obtained from the graph of FIG. 5 (which shows a relationship between lead angle and demagnetizing field). Thus, a lower grade magnet may be selected for use as the magnet Ma.

As specifically described above, the rotor 10 of the present embodiment includes the magnet Ma and the magnet Mb. The magnet Ma is arranged in each of the magnetic poles of the first rotor portion 11a. The magnet Mb is arranged in each of the magnetic poles of the second rotor portion 11b, being deviated, by the predetermined skew angle θ, from the magnet Ma provided in each of the magnetic poles of the first rotor portion 11a. In the rotor 10, the coercive field strength Cfa of the magnet Ma provided in each of the magnetic poles of the first rotor portion 11a is different from the coercive field strength Cfb of the magnet Mb provided in each of the magnetic poles of the second rotor portion 11b. Thus, a good advantage of enhancing the anti-demagnetization properties of the rotor is obtained by arranging the magnets each having optimum coercive field strength in each portion of the stage-skewed rotor.

Further, the first rotor portion 11a is arranged forward with respect to the rotation direction of the rotor 10 and with respect to the second rotor portion 11b. In addition, the coercive field strength Cfa of the magnet Ma provided in the first rotor portion 11a is lower than the coercive field strength Cfb of the magnet Mb provided in the second rotor portion 11b. Therefore, the magnet Ma may have a lower grade than that of the magnet Mb, thereby reducing the manufacturing cost of the rotor.

Since the grade of the magnets can be selected on the basis of the amount of demagnetizing field obtained according to a lead angle of the rotor 10, magnets can be easily selected and the manufacturing cost of the magnets can be reduced.

Further, the electric rotating machine 30 is configured to have the rotor 10 that includes the first rotor portions 11a and the second rotor portion 11b, and the stator 20 around which the winding 22 is wound. Thus, the electric rotating machine 30 can be produced at low cost.

Hereinafter, aspects of the above-described embodiments will be summarized.

As an aspect of the embodiment, a rotor (10) is provided which includes: a first rotor portion (11a); a second rotor portion (11b) which is arranged at a position deviated from the first rotor portion (11a) by a predetermined skew angle (θ) so as to contact the first rotor portion (11a); first magnets (Ma) each of which is provided in a magnetic pole of the first rotor portion (11a); and second magnets (Mb) each of which is provided in a magnetic pole of the second rotor portion (11b) and is arranged at a position deviated from the first magnet (Ma) of the first rotor portion (11a) by the predetermined skew angle (θ). Coercive field strengths (Cfa) of the first magnets (Ma) and coercive field strengths (Cfb) of the second magnets (Mb) are different from each other.

According to this configuration, magnets having optimum coercive field strength can be arranged in each portion of the stage-skewed rotor. Thus, this configuration can provide a good advantage of enhancing the anti-demagnetization properties of the rotor.

The present invention shall encompass those modes which are obtained by various changing, modifying and improving the present invention on the basis of the technical knowledge of a skilled person. Further, any embodiment to which such a mode is applied shall also be encompassed in the scope of the present invention, as far as the embodiment does not depart from the spirit of the present invention.

What is claimed is:

1. A rotor, comprising:
   a first rotor portion;
   a second rotor portion which is arranged at a position deviated from the first rotor portion by a predetermined skew angle so as to contact the first rotor portion in an axial direction of the rotor;
   first magnets each of which is provided in a magnetic pole of the first rotor portion; and
   second magnets each of which is provided in a magnetic pole of the second rotor portion and is arranged at a position deviated from the first magnet of the first rotor portion by the predetermined skew angle, wherein
   coercive field strengths of the first magnets and coercive field strengths of the second magnets are different from each other in the axial direction of the rotor.

2. The rotor according to claim 1, wherein
   the first rotor portion is arranged forward with respect to a rotation direction of the rotor and with respect to the second rotor portion, and
   the coercive field strengths of the first magnets are lower than the coercive field strengths of the second magnets.

3. The rotor according to claim 2, wherein
   grades of the first and second magnets are selected on the basis of an amount of a demagnetizing field obtained according to a lead angle of the rotor.

4. The rotor according to claim 3, wherein
   the grade of the first magnet is selected on the basis of the amount of the demagnetizing field obtained according to the lead angle of the rotor so that the first magnet will not be demagnetized.

5. An electric rotating machine, comprising:
   the rotor according to claim 1; and
   a stator around which a winding is wound.

6. The rotor according to claim 1, wherein
   each of the second magnets is arranged at the position deviated from the first magnets by the predetermined skew angle so that the second magnets contact the first magnets.

* * * * *